United States Patent [19]
Deroux-Dauphin et al.

[11] Patent Number: 6,023,454
[45] Date of Patent: Feb. 8, 2000

[54] DEFLECTION NETWORK

[76] Inventors: Patrice Deroux-Dauphin, 13, Rue du Rif Tronchard, Batiment A3, Saint Egreve, France, 38120; Christian Francois, Les Meunieres, Civrieux, France, 01390

[21] Appl. No.: 08/769,958

[22] Filed: Dec. 19, 1996

[30] Foreign Application Priority Data

Dec. 20, 1995 [FR] France .................................. 95 15509

[51] Int. Cl.$^7$ .................................................. H04L 12/00

[52] U.S. Cl. .......................... 370/235; 370/400; 370/414

[58] Field of Search ..................................... 370/235–386, 370/389, 392, 394, 400–412, 414, 416, 418, 230, 231; 340/825.07, 825.21, 825.52, 825.5, 825.51; 710/131, 132

[56] References Cited

U.S. PATENT DOCUMENTS

| 4,320,500 | 3/1982 | Barberis et al. | 370/400 |
| 5,416,769 | 5/1995 | Karol | 370/400 |
| 5,617,413 | 4/1997 | Monacos | 370/400 |
| 5,754,792 | 5/1998 | Shutoh et al. | 710/132 |
| 5,826,049 | 10/1998 | Ogata et al. | 710/132 |

Primary Examiner—Ricky Q. Ngo
Attorney, Agent, or Firm—Arthur L. Plevy

[57] ABSTRACT

A network for exchanging transactions between operators, includes a plurality of nodes, each of which includes a same number of inputs and outputs connected to operators or other nodes, and a mechanism for routing several transactions with a same destination towards different respective outputs, wherein each node comprises a routing table which associates one of the outputs of the node to each destination of a transaction.

8 Claims, 2 Drawing Sheets

DEFLECTION NETWORK

FIELD OF THE INVENTION

The present invention relates to a system for exchanging information between several operators, such as processors, memories, and peripheral devices. It relates more particularly to a deflection network.

DESCRIPTION OF THE RELATED ART

A particularly effective system for exchanging information uses crossbar switches. Each operator, often provided on an individual board, comprises an output crossbar and an input crossbar. The output crossbar serves to transmit information provided by the operator to another operator selected among a first set of operators, and the input crossbar serves to transmit to the operator information coming from a second set of operators.

In a typical system comprising processor boards and memory boards, the input and output crossbars of each processor board allow to exchange information with each of the memory boards, and the input and output crossbars of each memory board allow to exchange information with each of the processor boards.

A transaction, either a request issued by a processor or a reply issued by a memory, comprises a destination address and a transmitter address. Each crossbar examines the destination addresses of the transaction which it receives and determines the outputs associated to these transactions. If several transactions are in collision, i.e. these transactions are associated to a same output, only one of the transactions is sent to this output and the others are enqueued in a buffer memory.

A crossbar for such a system is particularly expensive. One of the reasons for this is that the control mechanism for the collisions, eventually by priority levels, is complex.

Another reason is that each crossbar comprises a relatively large buffer memory whose speed should be adapted to the high speed of the transfers. The size of the buffer memory determines the performance of the system. Indeed, if the buffer memory overflows, the operators which transmit transaction to the crossbar must be halted. The memory size is further increased because each transaction to be stored is comprised of a large number of bits (it comprises at least a transmitter address, a destination address, an instruction, a data address, and data).

Yet another reason is that the interconnection density of the crossbar increases rapidly with the complexity of the system, so that the connectors must be realized with extreme accuracy. Indeed, the number of input/output pairs of each board is equal to the number of boards with which the board must communicate. And, each input or output is of the size of a transaction.

In addition to the above-mentioned cost drawbacks, a crossbar system has a rigid structure. In other words, once the system is defined and assembled, it is impossible to upgrade it by adding operators.

In order to limit the interconnection density of the crossbars, the processor boards are generally only connected to the memory boards. If a first processor board should communicate with a second processor board, then a semaphore system is used, i.e. the first processor writes data at a specific memory location by setting a flag. The second processor periodically checks the state of the flag to know whether the specific location contains data for it. In addition to slowing down the exchange rate between two processors caused by the semaphore system, such a system should be carried out by programming the processors, which constitutes an additional constraint for the programmer.

Some of these drawbacks may be overcome by connecting the operators to a network formed of particular routing nodes which may be interconnected according to any topology. Each node comprises as many inputs as outputs and is designed to route several incoming transactions of same destination to distinct outputs. In other words, if several transactions collide in a node, one of the transactions is routed to its associated output and the other transactions are necessarily routed to respective different outputs. Thus, instead of enqueueing a transaction in a buffer memory, this transaction is deflected from its nominal path and will arrive to destination through a second path which is eventually longer. As a result, all the transactions injected into the routing network are in continuous circulation and they all arrive to destination, either through an optimal path, or through a deflected path.

Such a network is known as a "deflection network". An exemplary prior art deflection network is described in European Transactions on Telecommunications and Related Technologies, "Deflection Network: Principles, Implementation, Services", by Guido Albertengo et al., title 2.2 "Preference Algorithms". However, in this type of network, there are many issues in the design of simple but efficient algorithms for controlling the data flow.

SUMMARY OF THE INVENTION

An object of the invention is to provide a deflection network which is controllable by a simple but efficient algorithm.

This object is achieved by a network for exchanging transactions between operators, comprising a plurality of nodes, each of which comprises a same number of inputs and outputs connected to operators or other nodes, and means for routing several transactions with a same destination towards different respective outputs. An aspect of the invention is that each node comprises a routing table which associates one of the outputs of the node to each destination of a transaction.

According to an embodiment of the invention, each node comprises as many routing tables as inputs or outputs, each table associating a different output to a same transaction destination, so that several transactions of same destination are associated to different outputs provided by respective tables.

According to an embodiment of the invention, successive routing tables are associated to paths of decreasing preference for a predetermined destination and to decreasing priorities of the transactions, each node being operative to increase the priority of a transaction when this transaction is not routed according to a table of maximum preference.

According to an embodiment of the invention, each node comprises an additional routing table which associates to each input an output which is, with said input, on a path linking all the nodes and all the operators, this table being used for the transactions whose priority has reached an upper limit.

According to an embodiment of the invention, each node associates at random respective tables to several transactions of same priority and same destination.

According to an embodiment of the invention, each operator comprises an input and an output respectively connected to an output and an input of one or two nodes, the operator being operative to receive any transaction on its input and to send it immediately to its output if the transaction is not for the operator.

According to an embodiment of the invention, each operator sends back a transaction destined thereto when this transaction arrives at a moment when the operator is busy.

According to an embodiment of the invention, each operator generates and sends a zero priority transaction when the operator has no transaction to send, this transaction of zero priority being ignored by any operator which receives it.

According to an embodiment of the invention, each node generates and sends a transaction of zero priority on an output thereof which is unused at that time.

The foregoing and other objects, features, aspects and advantages of the invention will become apparent from the following detailed description of embodiments, given by way of illustration and not of limitation with reference to the accompanying drawings.

DETAILED DESCRIPTION OF THE PREFERRED EMBODIMENTS

According to the invention, a plurality of operators, such as processors, memories, peripheral devices, etc. which should exchange information, are connected to a network formed of routing nodes which may be interconnected in any manner. The invention more particularly resides in the function of each routing node.

Figure 1:
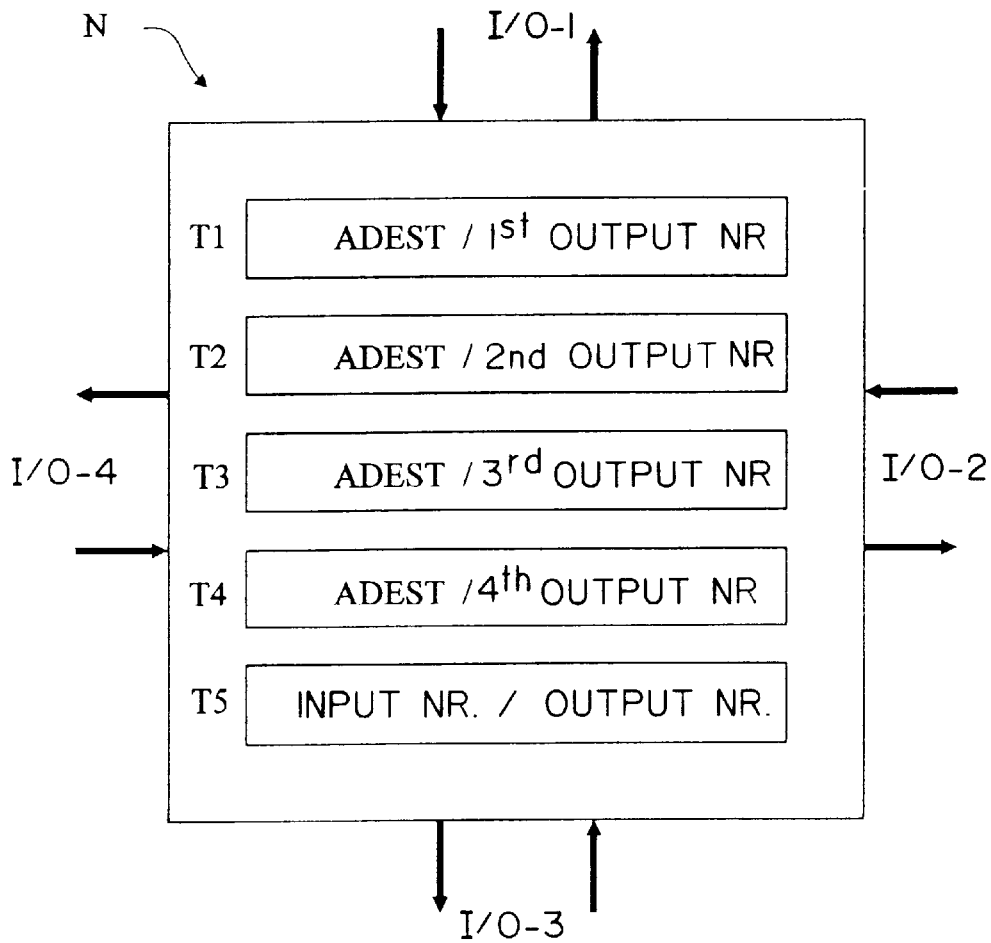
FIG. 1 schematically shows a routing node according to the invention comprising tables used in an optimized routing algorithm according to the invention.

FIG. 1 schematically shows a routing node N according to the invention. It is necessary that the node comprises as many inputs as outputs. Good results are obtained with nodes comprising, as shown, four pairs of inputs/outputs I/O, but any number greater than two may be used.

Each input or each output may be indifferently connected to an output or to an input of another node, of the same node, or of any operator provided with an interface adapted to a routing network according to the invention.

The essential function of each node N is to route several incoming transactions of same destination towards different outputs. In other words, if n transactions simultaneously enter the node (n being smaller or equal to the number of input/output pairs), these n transactions are immediately routed towards n respective outputs, even if some of the transactions must therefore take a longer path towards their destination. Instead of enqueueing a transaction in a buffer memory, any transaction which has penetrated the network is made to continuously circulate until it reaches its destination. Of course, it is desirable that each transaction reaches its destination as fast as possible.

The present invention provides an algorithm for controlling the routing of the inputs towards the outputs of a node in order to obtain an optimal transfer of the transactions towards their destinations. This algorithm, which is particularly simple, is preferably carried out by logic and sequential circuitry in each node N.

To carry out the algorithm, each node N comprises a table (T1–T4) for each input/output pair, which affects an output number to each possible destination of the transactions.

The output numbers affected to a same destination differ from one table to the other. The output numbers of the first table correspond to a preferential path, and the output numbers of the other tables correspond to deflected paths of decreasing preference.

A transaction circulating in a network according to the invention comprises, conventionally, a destination address field which identifies the operator to which the transaction is destined. It is all the used destination addresses which constitute the entries of the above-mentioned tables. Moreover, each transaction comprises, conventionally, a transmitter address field, a data address field, a data field, an instruction field, and a priority field. In a network according to the invention, the priority of a transaction is set to 1 by the transmitter of the transaction.

According to the above-mentioned optimized algorithm, when a node N receives a transaction through any of its inputs, the transaction is routed to the output associated to the destination address of this transaction in the first table Ti.

In case of collision, several incoming transactions have the same destination. In this case, the transactions are respectively routed, by decreasing order of priority, according to the first successive tables which associate a different output to each colliding transaction.

In case of collision between a small number of transactions, for example two, the output associated by the second table to the second transaction, of lower priority, may coincide with the output associated by the first table to a third non-colliding transaction. Then, the transaction of higher priority level is routed towards the conflicting output and the other transaction is routed according to a different table (the third transaction would be routed according to the second table or the second transaction would be routed according to the third table). And so on, until one different output is allocated to each of the incoming transactions.

As a result, all the incoming transactions are simultaneously routed towards respective different outputs, even if these outputs do not correspond to preferential paths.

A transaction which is not routed according to the first preferential table has its priority level increased by one.

Of course, the case may arise where several colliding transactions have the same priority. Then, the transactions are affected to different tables randomly.

The priority of a transaction has an upper limit determined by the number of bits of the priority field of each transaction. When a transaction reaches this upper limit, it is likely that specific circumstances render unfavorable the routing according to the normal tables as mentioned above. Another routing strategy is then preferably adopted.

For this purpose, each node N comprises an additional table TS associated to the transactions whose priority is at the upper limit. This table affects a different output number to each of the input numbers. Table TS is such that an input and its associated output are on a path (Euler path) which links all the elements of the network (nodes and operators). A transaction having its priority at the upper limit is necessarily routed towards the output provided by this additional table TS. Another transaction to which the same output would have been affected by a normal table is routed according to another normal table. Thus, all the transactions of upper limit priority take a path on which they will necessarily find their destination.

Among several input transactions of upper limit priority, only one, randomly chosen, is routed according to the additional table and the others are routed according to the normal tables, also randomly chosen, if necessary.

Figure 2:
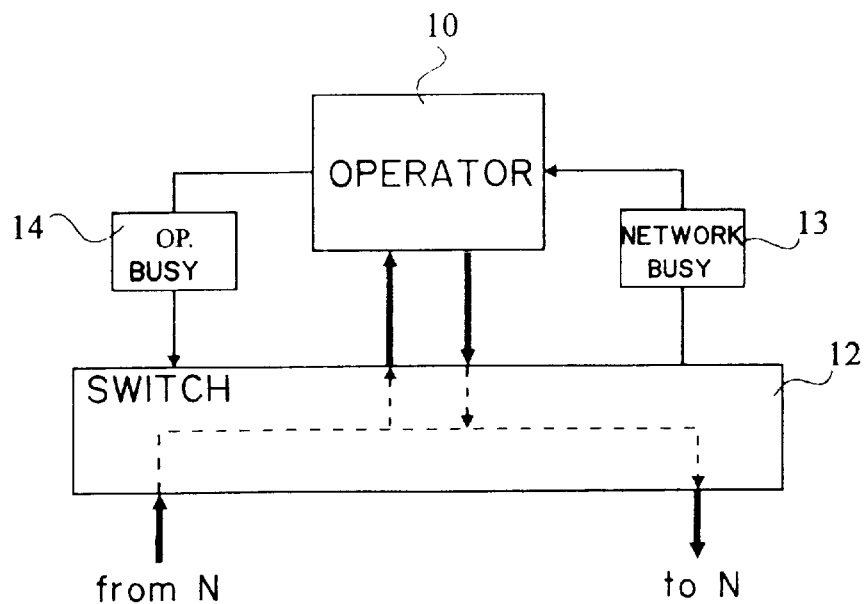
FIG. 2 schematically shows an embodiment of an interface between a routing node network according to the invention and an operator connected to this network.

FIG. 2 schematically shows an interface between a network according to the invention and an operator 10. The interface comprises a switch 12 which respectively connects an input of a node and an output of a node to the output and to the input of the operator 10.

When switch 12 receives a transaction from the network, this transaction is provided to operator 10 if its destination address corresponds to operator 10. Due to the previously described operation of the nodes according to the invention, switch 12 is also likely to receive transactions which are not destined to operator 10. In this case, the transaction is immediately sent back to the network by switch 12. In the meantime, switch 12 asserts a network busy signal 13 which stops the operator 10 from providing a transaction. This particularly simple mechanism allows to automatically manage the case where the network is saturated.

When operator 10 cannot handle a transaction, it asserts an operator busy signal 14. In this case, if the transaction received by switch 12 is destined to the operator 10, the transaction is immediately sent back to the network. According to a first alternative, the transaction is sent back to the network as such, so that it is likely to come back soon to the operator. According to a second alternative, switch 12 swaps the destination address and the transmitter address, so that the transaction is sent back to the transmitter which will then know that the transaction has not been handled and will be able to take adapted measures.

Like for the routing nodes, no transaction is enqueued in an operator.

Preferably, if an operator 10 does not provide a transaction whereas the network is free, switch 12 generates a fake transaction of zero priority. Each node also generates such fake transactions on unoccupied outputs. This simplifies the reception and processing circuitry of the transactions in a node or in an operator. Switch 12 associated to an operator is then designed to ignore any fake transaction it receives and to replace it, if necessary, with a true transaction.

Operators and routing nodes according to the invention may be interconnected in any manner, provided that each output (of a node or of an operator) is always connected to an input (of an operator, of another node, or of the same node). Of course, the normal tables T1–T4 and the additional table TS of each node contain values which depend on the topology of the network. The tables of each node are, for example, stored in non-volatile memories (ROM) or in volatile memories which are loaded at power-on by a program executed by on of the operators. In order to access the tables for update, they may just be connected to a conventional bus which does not need to be fast. Preferably, a test bus (IEEE 1149.1 standard) is used for this purpose, which is moreover used to test the components of the system.

Of course, the performance of the system depends on the chosen topology for the network. Generally, it is best to group the routing nodes in a central core about which the operators are connected.

Figure 3:
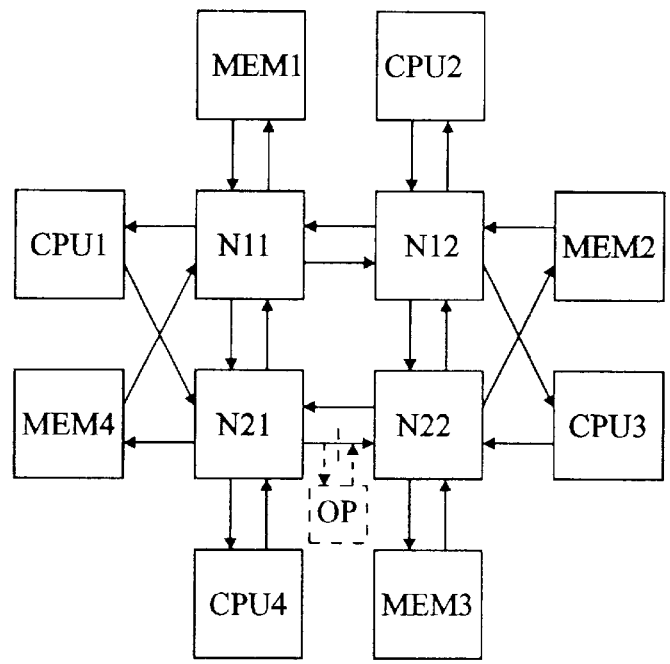
FIG. 3 shows an exemplary network according to the invention with four routing nodes for interconnecting eight operators.

FIG. 3 shows an exemplary network according to the invention with four routing nodes N11 to N22 for interconnecting eight operators (four processors CPU1 to CPU4 and four memories MEM1 to MEM4). The nodes are connected in a ring through two input/output pairs of each of the nodes. The two remaining input/output pairs of each of the nodes are connected to the operators. As shown for processors CPU1 and CPU3, and for memories MEM2 and MEM4, the input and the output of an operator are not necessarily connected to the output and to the input of a same node.

Figure 4:
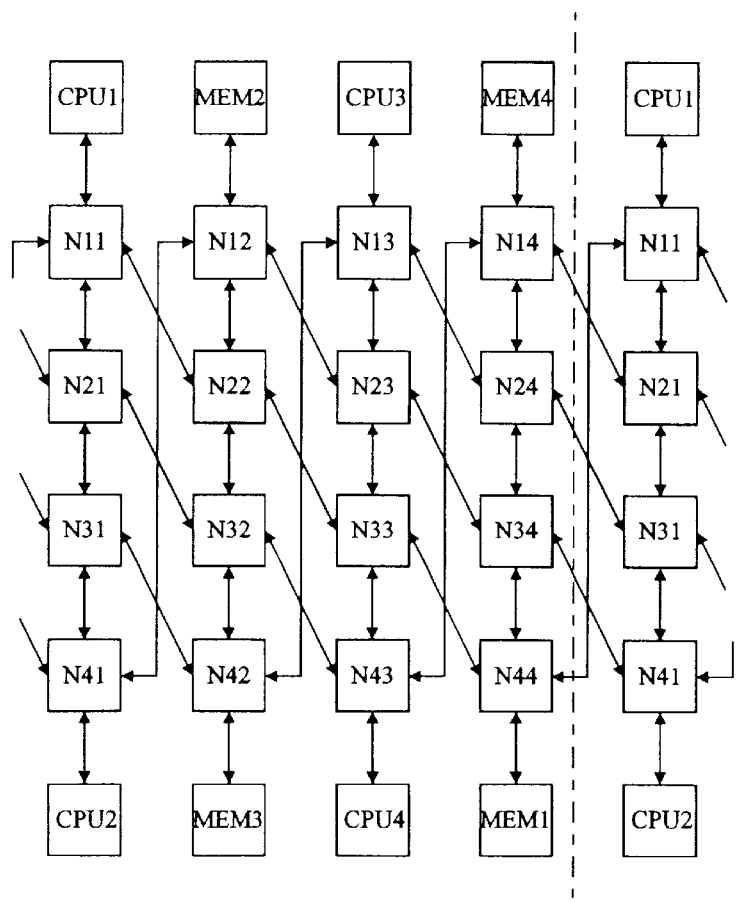
FIG. 4 shows an exemplary network according to the invention with sixteen routing nodes for interconnecting eight operators.

FIG. 4 shows an interconnection of the same processors and memories through an exemplary network with sixteen nodes N11 to N44 according to the invention. For sake of clarity, each input/output pair is shown by a single bi-directional link. The shown sixteen node topology of the network is an optimization with respect to a simple matrix structure. Here, each node $N_{ij}$ is connected to node $N_{i+1,j}$ and to node $N_{i+1,j+1}$ where i and j vary between 1 and 4 and where i+1 and j+1 are defined modulo 4. Nodes N11 to N14 are respectively connected to operators CPU1, MEM2, CPU3, MEM4 and nodes N41 to N44 are respectively connected to operators CPU2, MEM3, CPU4, MEM1.

Generally, each processor CPU essentially works with a single memory dedicated to it and occasionally with other memories. Thus, the processors are placed as near as possible to their dedicated memories. In FIG. 4, each memory dedicated to a processor is connected to this processor through only two nodes (for example memory MEM2 is connected to processor CPU2 through nodes N12 and N41).

It is particularly simple to upgrade an information exchange system according to the invention.

When an operator is removed, it is sufficient to connect to each other the input and the output left free on the network. It is not necessary to reprogram the tables but care should be taken so that the operators remaining on the network do not transmit transactions to the removed operator.

In order to add an operator, several solutions are possible. For example, the operator is inserted within a link between two nodes by connecting the input of the operator to the output of the first node and the output of the operator to the input of the second node. Such a change is shown in dotted lines in FIG. 3 between nodes N21 and N22. Of course, the tables of each of the routing nodes are then completed with the outputs associated to the new destination address corresponding to the new operator. In the example of FIG. 3, in the first table of node N21, the destination address of the new operator is associated to the output which is directly connected to this operator. In the first table of node N22, the new address is associated to the output connected to node N21.

Of course, one may attempt to reproduce the regularity of the node network when adding operators; this is then done by also adding nodes to the network.

In a practical implementation, each operator and each node is located on an individual board. In this case, the choice of four input/output pairs for each node corresponds to a good compromise between the number of nodes which are necessary for optimally interconnecting all the operators and the interconnection density of the boards. The maximum interconnection density is that of a node board and it is comparable, in this example, to that of a board of a conventional crossbar system having five boards, each of which may communicate with the four others. A network according to the invention advantageously allows to interconnect any number of boards with a fixed interconnection density.

The nodes and the operators may be interconnected by ribbon cables. The ribbons are constituted, depending on the needs, by simple wires, twisted pairs, or coaxial wires. The operating frequency of the system is determined by the maximum uninterrupted length of the wires. If the system should operate at a particularly high frequency, the length of the wires is reduced by multiplying the number of node boards placed between two distant points to interconnect; each node board serves as a synchronization relay.

The memory size occupied by the tables of a node is comparable to that of a buffer memory of a conventional crossbar, but the tables are not organized according to a buffer memory structure and they are accessed at high speed only for writing, which substantially reduces their cost.

The particularly simple routing algorithm according to the invention, including the tables, may be directly programmed on Fast Programmable Gate Arrays (FPGA) from which it is possible to economically constitute nodes operating at high speed.

The present invention has been described in relation with an optimized algorithm for controlling each routing node. However, other, less efficient, algorithms may be devised. For example, each node may only comprise one table. Among the colliding transactions, only one is routed according to the table and the others are randomly affected to different outputs.

We claim:

1. A network for exchanging transactions between operators and comprising a plurality of nodes, each of said plurality of nodes comprising:

a same number of inputs and outputs connected to operators or other nodes;

means for routing several transactions with a same destination towards different respective outputs; and, as many routing tables as inputs or outputs, each table associating a different output to a same transaction destination, so that several transactions of same destination are associated to different outputs provided by respective tables.

2. The network of claim 1, wherein successive routing tables are associated to paths of decreasing preference for a predetermined destination and to decreasing priorities of the transactions, each node being operative to increase the priority of a transaction when this transaction is not routed according to a table of maximum preference.

3. The network of claim 2, wherein each node comprises an additional routing table which associates to each input, an output which is, with said input, on a path linking all the nodes and all the operators, this additional routing table being used for the transactions whose priority has reached an upper limit.

4. The network of claim 2 or 3, wherein each node associates at random respective tables to several transactions of same priority and same destination.

5. The network of claim 1, wherein each operator comprises an input and an output respectively connected to an output and an input of one or two nodes, the operator being operative to receive any transaction on its input and to send it immediately to its output if the transaction is not for the operator.

6. The network of claim 5, wherein each operator sends back a transaction destined thereto when this transaction arrives at a moment when the operator is busy.

7. The network of claim 5, wherein each operator generates and sends a zero priority transaction when the operator has no transaction to send, this transaction of zero priority being ignored by any operator which receives it.

8. The network of claim 7, wherein each node generates and sends a transaction of zero priority on an output thereof which is unused at that time.

* * * * *